United States Patent
Brink (10) Patent No.: US 6,872,119 B2
(45) Date of Patent: Mar. 29, 2005

(54) GARMENTS HAVING EDIBLE COMPONENTS AND METHODS FOR MAKING SAME

(76) Inventor: Jeffrey H. Brink, P.O. Box 620581, Littleton, CO (US) 80162

( * ) Notice: Subject to any disclaimer, the term of this patent is extended or adjusted under 35 U.S.C. 154(b) by 0 days.

(21) Appl. No.: 10/806,595

(22) Filed: Mar. 22, 2004

(65) Prior Publication Data

US 2004/0181857 A1 Sep. 23, 2004

Related U.S. Application Data

(60) Provisional application No. 60/456,593, filed on Mar. 21, 2003.

(51) Int. Cl.⁷ ................................................ A41C 3/00
(52) U.S. Cl. ............................... 450/86; 450/88; 2/244; 2/246
(58) Field of Search ............................ 450/1, 86, 88, 450/58, 89; 2/69, 67, 311, 312, 338, 327, 336, 244, 246, 227, 228, 238, 105, 106, 115, 113, 400, 403, 406, 405; D2/700, 701, 703, 705, 706, 708, 718, 720, 731, 733, 734, 741, 763–768, 770–777, 503, 508, 600, 604, 631, 844

(56) References Cited

U.S. PATENT DOCUMENTS

| | | | | |
|---|---|---|---|---|
| 2,544,840 A | * | 3/1951 | Kowatsch | 2/67 |
| 2,584,669 A | * | 2/1952 | Bryant | 425/465 |
| 2,624,881 A | * | 1/1953 | Dunson | 450/89 |
| 4,304,006 A | | 12/1981 | Swart | |
| 4,993,348 A | | 2/1991 | Wald | |
| 5,014,359 A | | 5/1991 | Hanson | |
| 5,031,241 A | | 7/1991 | Wiedmann | |
| 5,093,935 A | * | 3/1992 | Countee, Jr. | 2/400 |
| 5,172,430 A | * | 12/1992 | Lerma-Solis | 2/400 |
| 5,220,692 A | | 6/1993 | Cox | |
| 5,285,940 A | | 2/1994 | Goulter | |
| 5,328,265 A | | 7/1994 | Clooney | |
| 5,351,450 A | | 10/1994 | Moskowitz | |
| 5,361,412 A | | 11/1994 | Perry | |
| 5,377,359 A | | 1/1995 | Jiang | |
| 5,457,820 A | | 10/1995 | Yielding | |
| 5,960,472 A | | 10/1999 | Reid | |
| 6,018,823 A | * | 2/2000 | Ortmeier | 2/406 |
| 6,047,402 A | | 4/2000 | Chester-Salter | |
| 6,086,451 A | * | 7/2000 | Fernandes | 450/86 |
| 6,095,058 A | | 8/2000 | Earnhart | |
| 6,274,519 B1 | | 8/2001 | Omori et al. | |
| 6,279,171 B1 | * | 8/2001 | Brancato | 2/326 |
| 6,334,220 B1 | | 1/2002 | Frye | |
| 6,530,089 B2 | | 3/2003 | Frye | |
| 6,536,048 B2 | | 3/2003 | Frye | |
| 6,581,210 B2 | | 6/2003 | Kaloustian | |
| 2003/0196239 A1 | | 10/2003 | Zic et al. | |
| 2003/0196241 A1 | | 10/2003 | Zic et al. | |

OTHER PUBLICATIONS www.Nostalgic Candy.com Candy Necklaces showing well known candy necklaces sold for at least 30 years.*
www.Candyfavorites.com showing candy necklaces sold for at least 30 years.*
Playboy Ad "Eye Candy"; *Playboy*; Apr. 2004: p. 170.

* cited by examiner

*Primary Examiner*—Gloria M. Hale
(74) *Attorney, Agent, or Firm*—Sheridan Ross P.C.

(57) ABSTRACT

A garment having edible components associated therewith can be made by stringing apertured edible items or candies onto fabric portions, for example, waistbands of panties, bikinis, etc. Strings of fabric can accommodate a variety of different types of edible materials and such materials can be of many shapes and sizes, in particular can reflect any particular holiday event in the year (e.g., hearts for Valentine's Day; shamrocks for St. Patrick's Day; pumpkins for Halloween, etc.). The garments can be re-used with or without rethreading edible items or candies of choice, and a kit for facilitating this practice forms one aspect of the present invention.

7 Claims, 5 Drawing Sheets

GARMENTS HAVING EDIBLE COMPONENTS AND METHODS FOR MAKING SAME

CROSS REFERENCE TO RELATED APPLICATION

This application claims priority to U.S. Provisional Patent Application No. 60/456,593 filed Mar. 21, 2003 and entitled "GARMENTS HAVING CONFECTIONARY COMPONENTS AND METHODS OF MAKING SAME", which is incorporated herein by reference in its entirety.

FIELD OF THE INVENTION

The present invention is generally directed to garments having edible components associated therewith and, in particular, is directed to men's and women's lingerie and bathing suits that have at least a portion thereof with edible candies associated therewith.

BACKGROUND OF THE INVENTION

The popularity of undergarments has increased significantly over the last few decades as witnessed by the success of Victoria Secrets and similar lingerie stores. Swim wear has long been an established component of the garment industry. With the worldwide fitness craze, individuals are increasingly exposing their semi-clad bodies in public. The more fanciful and audacious the garments worn in public, the more attention is given by onlookers. A recent trend has been to expose undergarments once covered beneath clothes and the wearing of such undergarments by themselves, without any exterior garments and/or with sections of undergarments protruding from pants, shirts, etc. There is therefore a fashion trend toward exposing undergarments in a tasteful and sexy fashion.

There exists in the marketplace edible undergarments, such consumable garments typically manufactured from one thin sheet/film of edible material. Such edible undergarment material is not intended for more than "one use"—if that. There are no reusable garment components to such prior art "edible panties" and the purpose of the same is more as a gag gift for bachelor or bachelorette parties, etc. Such edible panties are also not designed nor suitable for wearing in public, nor are they comfortable to wear.

SUMMARY OF THE INVENTION

The present invention is directed, in one embodiment, to undergarments having as a component thereof an edible item, such as a candy substance. In a preferred embodiment, one or more different sized and/or shaped candies (or a plurality of same sized/shaped candies) having at least one aperture therethrough are threaded on one or more portions of a garment and such candy components therefore provide a visual as well as an edible component of the garment. In one particular example, underwear of a female and/or a male is provided with candy strung on elongate pieces of underwear that extend from a front-most portion of the undergarment to the back-most portion of the undergarment, thereby providing a string of candy along the exterior side waist region of a wearer of such a garment. One or more strings of such candy aperture components can be provided with any given undergarment. In other embodiments, brassieres can be fashioned in a manner that accepts the apertured candies on one or more straps that are adapted to be tied or fitted to the other brassier components. Numerous and varied embodiments of other aspects of the present invention are pictured in the figures appended hereto and referred to as part of the written description.

In one particularly preferred embodiment, candies similar to or identical with those sold as a "candy power necklace" manufactured by Galerie Hebron, Kentucky and/or candies identified under the trademark Smarties® are utilized to create articles falling within the claims of the present invention. The size, color and structure of such candies is believed to be particularly desirable for most purposes, at least with respect underwear and swim wear embodiments.

It is one aspect of certain embodiments of the present invention to provide an assembly having edible components associated therewith, wherein the assembly comprises a garment to be worn by a user, such garment having at least one structural supporting element that is at least partially detachably interconnectable with another garment component. In addition, the assembly includes a plurality of apertured candies having an aperture sized so as to be threadable on the at least one structural supporting element.

It is a separate aspect of certain embodiments of the invention that at least one component of a garment embodying the invention is non-edible. Thus, in one aspect of the invention, a garment for a person is provided, the garment comprising at least one non-edible strap and at least one edible item interconnected to the strap, and wherein the garment can be worn by the person.

It is a separate aspect of certain embodiments of the invention that a strap interconnected to a garment include qualities to accommodate the candy interconnected thereto and wherein the garment is washable or dry cleanable after the edible item or candy is removed. Thus, it is one aspect of certain embodiments of the present invention to provide a garment for covering a portion of a person's body, the garment comprising a front panel and a rear panel interconnected to the front panel by a crotch portion. The garment also includes at least one strap interconnectable to the front panel and the rear panel, the strap adapted for passing through an aperture of an edible candy, the strap consisting essentially of: a material having a length greater than or equal to a width of the candy, the material having a width that is greater than or equal to a diameter of the aperture of the candy, the material having an outside surface that contacts an inside surface of the aperture, the outside surface of the material developing a frictional force with the inside surface of the candy that is equal to or greater than a weight of the candy, the strap having a loop at an end portion, the loop wrapping around (or capable of being wrapped around) at least a portion of the candy. In addition, upon removing the candy from the strap, the front panel, the rear panel, the crotch portion, and the strap are non-edible and washable.

It is a separate aspect of certain embodiments of the present invention to provide a garment with a plurality of straps, and wherein at least one of the straps is adapted for receiving an edible item thereon. Thus, in one aspect of the invention a garment for covering a portion of a person's body is provided, the garment comprising a front panel including a right front strap and a left front strap, and a rear panel interconnected to the front panel by a crotch portion, the rear panel including a right rear strap interconnectable to the right front strap, and a left rear strap interconnectable to the left front strap. In addition, the garment includes at least one edible item having an aperture sized to slidably receive one of the right front strap, the left front strap, the right rear strap and the left rear strap, and wherein the at least one edible item is located on one of the right front strap, the left front strap, the right rear strap and the left rear strap.

It is a separate aspect of certain embodiments of the present invention to provide a device at the end of a strap, wherein the device is adapted for receiving an edible item on the interconnected strap. Thus, it is one aspect of the present invention to provide a strap for receiving an edible item thereon, wherein an end portion of the strap includes a retention fitting. The retention fitting preferably comprises a substantially conical tip portion and a flared portion made of a resilient material. Other connecting means can be employed (e.g., clasps, etc.), but preferred embodiments employ at least one connecting means that permits edible items to be readily re-strung.

It is a separate aspect of the present invention to provide a garment having a plurality of straps with devices at the end of at least two straps, wherein the devices are adapted for receiving an edible item on to the straps. Thus, it is one aspect of the present invention to provide a garment having a plurality of straps for receiving an edible item thereon, wherein an end portion of one of the straps includes a first retention fitting and an end portion of another of the straps includes a second retention fitting, wherein the retention fittings preferably comprise a substantially conical (e.g., pointed) tip portion and a flared portion made of a resilient material, wherein the resilient material is deformable to receive an apertured edible item pushed over the flared portion. In addition, the garment preferably includes a means for detachably attaching the first retention fitting to the second retention fitting.

It is a separate aspect of the present invention to provide a breast retention garment, such as a bikini top or bra, that includes an edible item on a strap. Thus, it is one aspect of the present invention to provide a bra comprising a first cup and a second cup interconnected to the first cup by a strap, wherein an edible item is threaded onto the strap.

It is yet a separate aspect of certain embodiments of the present invention to provide a permanently attached device, a detachably attachable device, or a separate device, wherein the device includes a strap and containing an edible item thereon. Thus, in one aspect of the invention, a fob for attaching to an article is provided, the fob comprising at least one non-edible strap and at least one edible item interconnected to the strap by passing the strap through an aperture in the at least one edible item. In addition, in certain embodiments the strap of the fob further comprises a material having a width that is greater than or equal to a diameter of the aperture of the edible item, the material having an outside surface that at least partially contacts an inside surface of the aperture, the outside surface of the material developing a frictional force with the inside surface of the edible item that is equal to or greater than a weight of the edible item. In addition, the strap may further comprise a loop at an end portion of the strap, the loop wrapping around at least a portion of the edible item.

It is yet a separate aspect of the present invention to provide an edible item that has a wrapper, wherein the wrapper has an aperture axially aligned with the aperture of the edible item.

It should be appreciated that this Summary of the Invention does not contain all of the aspects and embodiments of the present invention and it is expressly understood that this summary should not be construed as limiting the present invention in any way. The following description of the various other aspects and embodiments as set forth in the detailed description and in the drawings should also be consulted.

BRIEF DESCRIPTION OF THE DRAWINGS

The above and other aspects, features and other advantages of the present invention will be more clearly understood from the following detailed description taken in conjunction with the accompanying drawings, in which:

FIG. 3 is a detail drawing showing of one possible relative size configuration for a candy and a strap;

FIGS. 4.1–4.10 are drawings showing variety of possible shapes for edible items or candies that may be placed on a strap;

FIG. 6. is an elevation view of a separate aspect of the invention comprising an optional retention fitting that may be used at an end portion of a strap;

DETAILED DESCRIPTION

One embodiment of the present invention is directed to undergarments and/or swim wear (e.g., a bikini) having at least a portion thereof that facilitates the connection of edible components to the garment. For example, a women's panty having string components that attach the front and back pieces of fabric is provided with candies that have an aperture running therethrough so as to permit sliding of such candies onto the string. The string component is preferably detachable from the remainder of the garment/panty, but in certain embodiments, the panty is made with the candies already attached to a string component that is not readily detachable. In such an instance, the panty is worn with the candies associated therewith, but can also be worn after the candies are eaten or otherwise removed. The string component of the garment can be reversibly attachable to the garment to make it easy for additional candies to be strung on to the garment when needed. This feature also permits one to change the color, type, shape, etc. of the candies (or other elements) attached to any particular garment. Strings of fabric can accommodate a variety of different types of edible materials and such materials can be of many shapes and sizes, and in particular can reflect any particular holiday event in the year (e.g., hearts for Valentine's Day; shamrocks for St. Patrick's Day; pumpkins for Halloween, etc.). Various different shapes may therefore be selected for the candies as desired by the type of occasion, for example, hearts, diamonds, shamrocks, candy canes, pumpkins, ghosts, butterflies or cherries.

It should be appreciated that the present invention encompasses both garments for women as well as men, and certainly has particular application with respect to children's garments. While the present description of various preferred embodiments of the present invention are specifically directed to admittedly sensually focused items that are intended for use with young adults in bar and beach settings, there are other aspects of the present invention specifically directed to garments intended for children. Indeed, the aspect of having candies associated with garments is believed to have a very strong appeal with children, such garments including hats, caps, shirts, hooded sweat shirts, belts, etc.

The material of the garment portion of the present invention can be any suitable material that allows for the association of edible items (e.g., candies) therewith, either by adhesives, physical connections, etc., with physical stringing of candies being the preferred mode of associating candies with any particular garment. It has been found that use of string material having at least one side being velvet assists in the stringing operation. Any suitable string-like component, however, can be used, including elastomeric material, water-proof material, swim wear material, etc. It is also within the scope of the present invention to use one or more edible strings to thread candies onto. Machines of various types (as will be known by those of skill in the art) can be used to facilitate the stringing of candies onto strings to construct the garments of the present invention. A garment of the present invention can be made using equipment and knowledge within the skill of an ordinary artisan, but in one embodiment, a garment having string-like components is used and candies are attached (e.g., by stringing) onto such strings.

The nature of the edible components used, preferably candies, can vary greatly. As defined herein, edible item or edible items can include a food that is digestable by humans, such as sugar-containing foods, bakery, liquid-filled elements, medicants, etc. Preferably an edible item will comprise a typical candy such as a piece of Smarties® candy, but for purposes of the claims and this description, the term "edible item" or "edible items" is not limited to merely the use of a traditional sugar-based candy, but also includes gums, breath mints, vitamins, lozenges, mendicants, VIAGRA® (Sidenafil citrate), etc., and further includes other items such as ecstasy and other mind altering drugs, some of which may currently be regulated substances, and further includes any edible substance. The use of the term "edible item" herein should be understood to encompass all such varied possibilities. Preferably, the edible items used as part of the present invention have features that permit them to be individually attached to a garment, most preferably by stringing such individual elements together to form a string or strap that forms part of the structure of a garment. It is within the scope of the present invention to also include non-edible components/items along with edible components/items. For example, clothes items that include a string having at least one edible component on a string that also includes one or more of jewelry items (e.g., stones, pearls, chain elements, shells, etc.) is but one of many embodiments of the present invention.

One of the unique aspects of the present invention is that, unlike prior art "edible panties," certain embodiments of the present invention permits a user to re-sting candies onto the garment numerous times for numerous uses. Thus, in a preferred embodiment, the garment is not disposable and at least a portion thereof is non-edible. Certain structural aspects of any particular garment, however, can be formed from candy structures other than the preferred hollow centered candies. For example, string licorice can be used as the strings to connect otherwise inedible components of a garment. In still other embodiments, beads of edible material can be partially impregnated onto a fabric to create a desired design, color, slogan, etc., either alone or in combination with other candy portions of the garment as described herein.

The non-edible garment portions of the present invention can be of any material, but preferably elastic string or strap components are used to facilitate different sized individuals. Suitable swimwear material can be used for bikini-candy embodiments, or other water tolerant materials can also be used. In one embodiment of the present invention, candy fibers or yarns are formed to create at least a portion of the garment.

While the central intent of most embodiments of the present invention is to generate a conversation piece and expand the "fun factor" of any social gathering, there are other more functional aspects of other embodiments, where vitamins, medicines, etc. can be provided on garments to facilitate travelers needs and to provide desired consumable items close at hand. Even winter sports enthusiasts can benefit from the present invention with respect to embodiments that incorporate candies and/or edible items with ski hats, clothing, accessories, etc. Energy candies or gums (e.g., Sobe™ Energy Gum) can be strung onto string-like components of hats, etc., to allow a sport enthusiast to eat the same while actively participating in the sport.

Still other embodiments of the present invention incorporate pockets on the garments, in addition to having the candies associated elsewhere, such pockets also adapted to hold candies, for example, as replacements for those consumed or eaten off of the strings.

Although the majority of the descriptions of many embodiments of the present invention are directed particularly to either swim wear or underwear, and are further concerned with candies associated with such garments, one of skill in the art will appreciate that the present invention has application in conjunction with a variety of other garments and can use elements other than candy. For example, instead of candy, certain types of cookies, crackers, medications (e.g., VIAGRA® ((Sidenafil citrate)), vitamins, etc.) can be used instead of or in addition to candy elements. Other types of garments may include hats, caps, shirts, pants, shoes, stockings, socks, jock straps, G-strings, belts, garter belts, head bands, etc. In certain embodiments of the present invention, known devices may be employed as the material upon which edible items are attached. For example, U.S. Patent Publication No. 2003/0196239, entitled "Device and Method of Use for Converting Style of Clothing and Decorating Clothing" is incorporated herein in its entirety by this reference. One aspect of the present invention is directed to a method for making the above-described garments having edible components. In a preferred method, edible items, such as the candy apertured components described herein, are individually threaded onto strand and/or string-like material. The string-like material can be knotted after each and/or a desired number of edible items are threaded on such strands. As described elsewhere, other non-edible components such as stones, sea shells, pearls, etc. can also be strung amidst the candied edible components of the present invention. After a desired number of edible and/or non-edible components are strung, the string-like material can be tied or otherwise affixed to accommodate the retention of such strung material thereon. This can be accomplished by simply tying two string-like materials together (such as a side tie for a bikini) or a connection device, such as a clasp, a hook and loop connecting means (Velcro®) structure can be employed, etc.

Figures 1, 2:
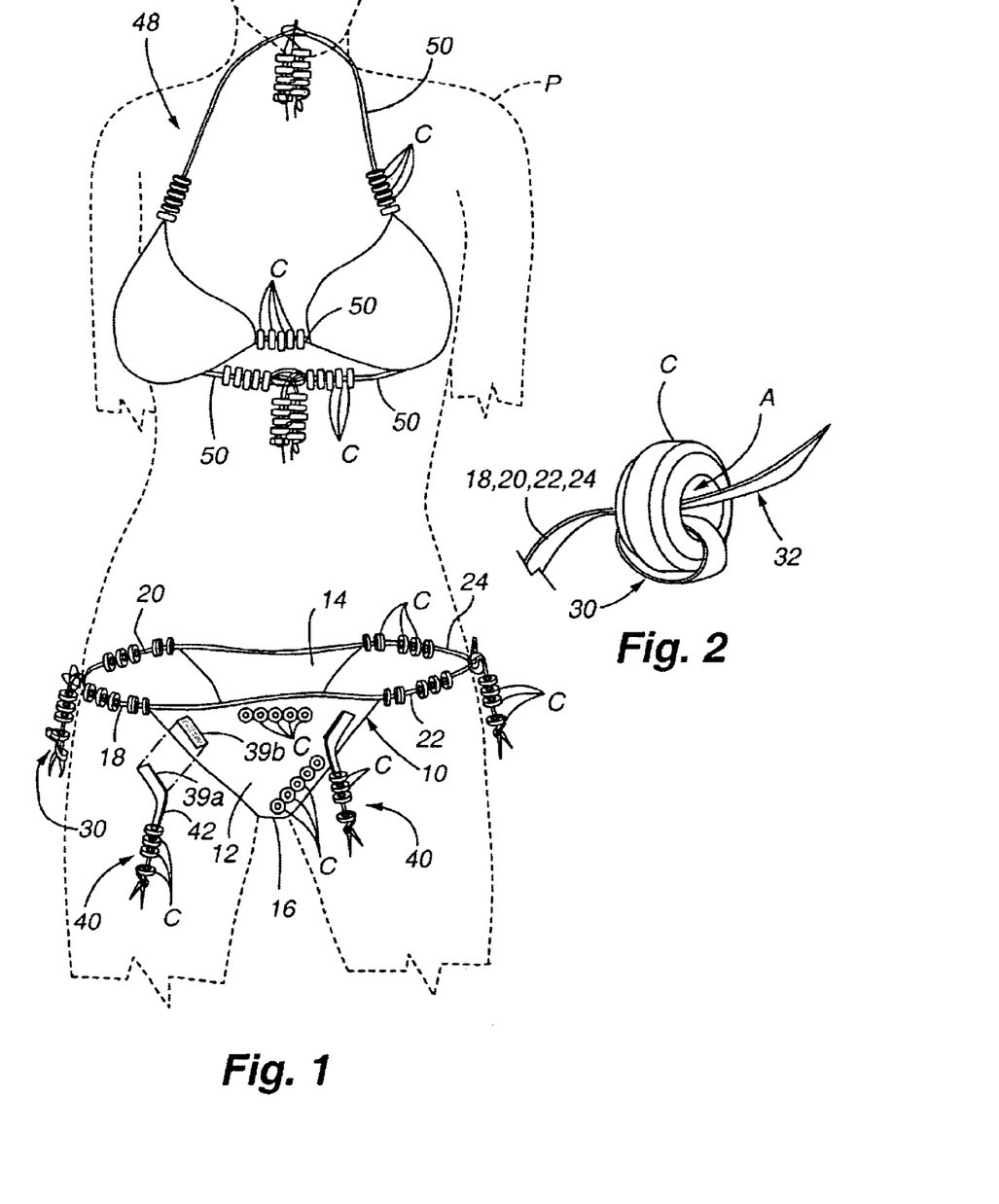
FIG. 1 illustrates one embodiment of the present invention on a person where edible items or candies having apertures are strung onto strings or straps associated with a panty, and where edible items or candies may also be positioned on other parts of the panty; in addition, a garment in the form of a bra or bikini top is shown with edible items or candies attached thereto.
FIG. 2 is detail drawing that shows an end portion of a strap and a candy slid thereon.

Referring now to FIG. 1, a garment 10 in accordance with one aspect of the present invention is shown. Garment 10 is shown to be in the form of a bikini bottom, undergarment, panty, or underwear bottom; however, it is to be understood that the present invention may pertain to other types of garments, such as a string bikini top, bra, or any garment or article with string or strap portions. Thus, garment 10 shown in FIG. 1 is an example of the present invention.

For a bikini bottom, undergarment, panty, or underwear bottom, the garment 10 preferably includes a front panel 12 and a rear panel 14. The front panel 12 and rear panel 14 may each be a variety of shapes, to include a section of material, lace, and/or webbing, and/or a plurality of straps, or a single strap. The front panel 12 is preferably interconnected to the rear panel 14 along a crotch portion 16, wherein the crotch portion 16 may include a solid or slit section of fabric, and/or a string, strap, or connector, such as a hoop, snap, or hook and loop connector. In addition, the front panel 12 preferably includes at least one strap interconnecting the front panel 12 to the rear panel 14. For the preferred embodiment shown in FIG. 1, both the right and left sides of garment 10 include straps that interconnect the front panel 12 to the rear panel 14. More particularly, the front panel 12 preferably includes a right front strap 18 that can be interconnected, such as by tying, to a right rear strap 20. In addition, the front panel 12 also preferably includes a left front strap 22 that can be interconnected, such as by tying, to a left rear strap 24.

Still referring to FIG. 1, garment 10 includes at least one, and more preferably, a plurality of edible or consumable items interconnected to at least one of the straps associated with the garment 10. For the preferred embodiment illustrated in FIG. 1, the garment 10 includes a plurality of edible items or candies C threaded on to or otherwise placed along the straps 18, 20, 22, and 24. In general, one or more of the right front strap 18, right rear strap 20, left front strap 22, or left rear strap 24 include an edible item or candy C slid onto the straps 18, 20, 22, or 24 by inserting the subject strap 18, 20, 22, or 24 through an aperture A in the edible items or candies C. For the particular design of the article shown in FIG. 1, the person wearing the garment 10 also uses the straps 18, 20, 22, 24 to secure the garment 10 to their person.

In a separate aspect of the invention, the garment 10, with the exclusion of the edible item or candy C, is made of a washable or dry-cleanable material. Therefore, after the edible item or candy is removed from the garment 10, the garment may be laundered and then worn again by the user. In addition, the garment 10 preferably can have additional edible items or candy C threaded or slipped onto one or more of the straps 18, 20, 22, and 24 of the garment 10 after it has been washed. In one preferred embodiment, where the garment is a pair of panties, bikini bottom, or underwear, the garment is made using approximately 50 inches of elastic, 80 inches of silk ribbon, and ½0th square yards of fabric. Obviously, the amount of material used will depend upon size and particular design characteristics of the garment that is produced.

Figures 3, 6, 49, 410:
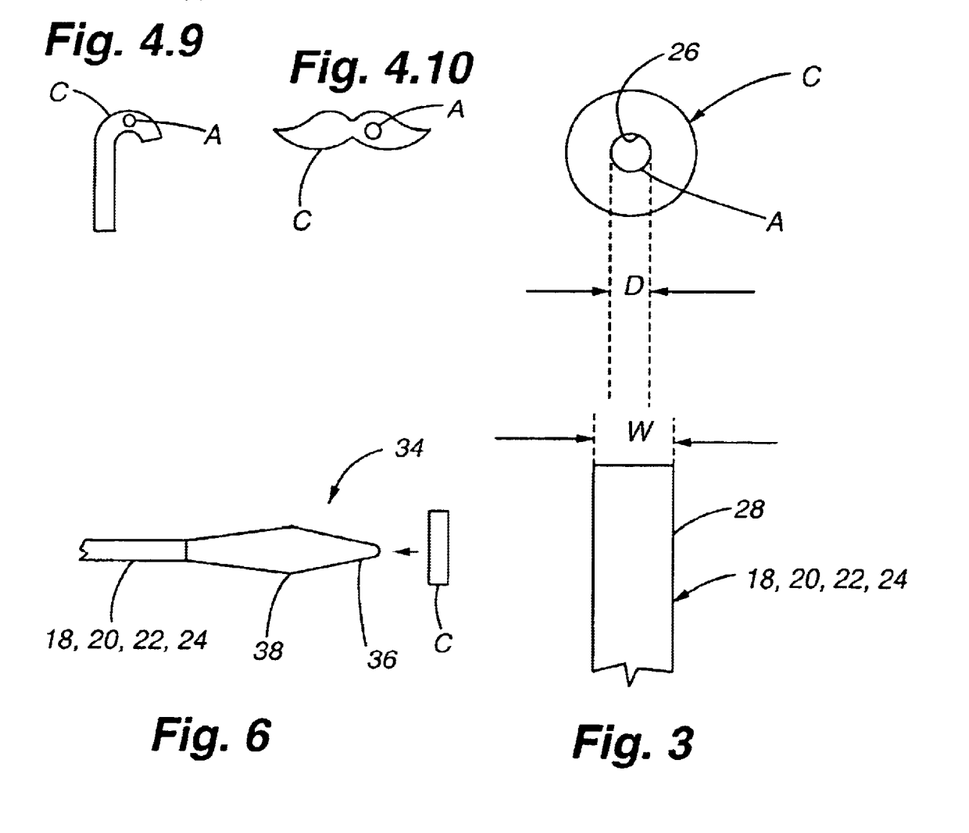

Referring now to FIGS. 2 and 3, in a separate aspect of the present invention, a strap 18, 20, 22, or 24 is used wherein the strap 18, 20, 22, or 24 preferably has a width W that is greater than or equal to the size or diameter D of the aperture A of the edible item or candy C. Preferably, the frictional forces generated by the contact of the inside surface 26 of the aperture A of the edible item or candy C with the outside surface 28 of the strap 18, 20, 22, or 24 is equal to or greater than the force generated by the weight of the edible item or candy C. Thus, the edible item or candy stays on the strap 18, 20, 22, or 24. The size of the width W of the straps 18, 20, 22, 24 can be chosen to provide adequate frictional characteristics when contacting the inside surface 26 of the of aperture A of the edible item or candy C. In addition, the material chosen to use as the strap can also be specifically chosen to provide a desirable frictional performance with the edible item or candy C. More specifically, the inventor has noted a preference for using strap 18, 20, 22, or 24 having a velvet outside surface 28; in alternate embodiments, the strap 18, 20, 22, or 24 is made of silk or satin.

Referring again to FIG. 2, in yet a separate aspect of the invention, a loop 30 may be formed with the strap 18, 20, 22, or 24 by looping an end portion 32 of the strap through the aperture A a second time. That is, at least one edible item or candy C is first slid onto the strap 18, 20, 22, or 24, and then the end of the strap is passed around at least one of the edible items or candies C and back through the aperture A again. The loop 30 does two things to secure the edible item or candy C to the strap 18, 20, 22, or 24: first, more strap material is positioned within the aperture A of the edible item or candy C so that greater surface area and frictional contact is made between the strap and the inside surface 26 of the edible item or candy C; and second, the loop 30 around edible item or candy C acts to further support the weight of the edible item or candy C. Thus, edible item or candy C can be secured to the strap 18, 20, 22, and 24 without the use of an additional fitting or even a knot at the end of the strap 18, 20, 22, and 24, although the use of a knot and/or an additional fitting at the end of the strap 18, 20, 22 and 24 are encompassed by the present invention. In addition, the loop 30 allows an edible item or candy C to be placed at the end of the strap 18, 20, 22, and 24 and beyond the location where the straps are interconnected, such as by tying, where the edible item or candy has an aperture A that is larger in size than the width W of the strap 18, 20, 22, and 24.

Referring now to FIGS. 4.1–4.10, a variety of possible shapes of edible items or candies or shown. FIG. 4.1 is a heart-shaped edible item or candy C having an aperture A. FIG. 4.2 is an octagon-shaped edible item or candy C similar in shape to a stop sign; FIG. 4.3 illustrates a star-shaped edible item or candy C; FIG. 4.4 is a elliptical-shaped edible item or candy C; FIG. 4.5 is a circular-shaped edible item or candy C; FIG. 4.6 is a cherry, pumpkin or bomb-shaped edible item or candy C; FIG. 4.7 is a diamond-shaped edible item or candy C; FIG. 4.8 is a shield-shaped edible item or candy C; FIG. 4.9 is a candy-cane-shaped edible item or candy C; and FIG. 4.10 is a lips-shaped edible item or candy C. For the edible items or candies used as part of the present invention, all of the edible items or candies preferably include an aperture A as shown in FIGS. 4.1–4.10. Obviously, a wide variety of shapes are possible, and offer a number of suggestive messages to a person receiving or viewing the edible item or candy.

Figure 5:
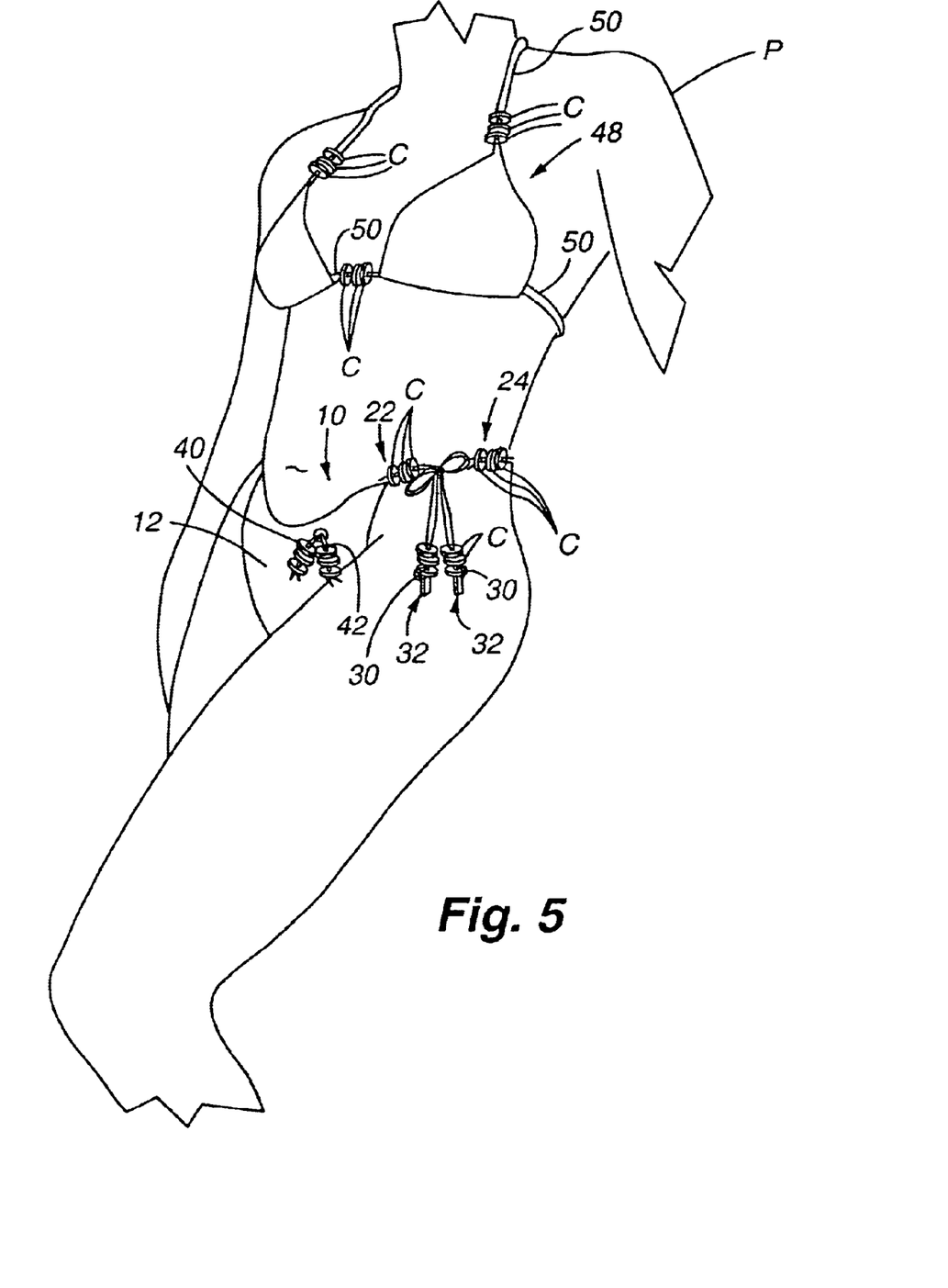
FIG. 5 is a side perspective view of a person wearing the garments shown in FIG. 1.

Referring now to FIG. 5, a person P is shown wearing garment 10 and a bikini top or bra 48, as described below. Front left strap 22 and rear left strap 24 are shown tied to one another, thus providing a structural aspect to the garment. In addition, the straps 22 and 24 include edible items or candies along their length. In addition, a loop 30 is used to secure edible items or candies on to the end portion 32 of the straps 22 and 24.

Referring now to FIG. 6, in a separate aspect of the invention, a retention fitting 34 is attached to the end portion 32 of the strap 18, 20, 22, and 24. Retention fitting 34 preferably has a substantially conical-shaped tip 36 and a flared portion 38, and is also resilient such that it can be deformed to slip an edible item or candy C on or off of the strap to which it is attached, yet retain its flared shape after passing an edible item or candy C over the flared portion 38. The retention fitting 34 allows a person to add and remove edible items or candies C from the strap without the edible items or candies C falling off of the strap 18, 20, 22, and 24, because the edible items or candies C are retained by the flared portion 38 that is larger in size than the aperture A of the edible item or candy C. Thus, the retention fitting 34 may be used with an edible item or candy C that has an aperture A that is larger in size than the width W of the strap 18, 20, 22, and/or 24.

Figure 7:
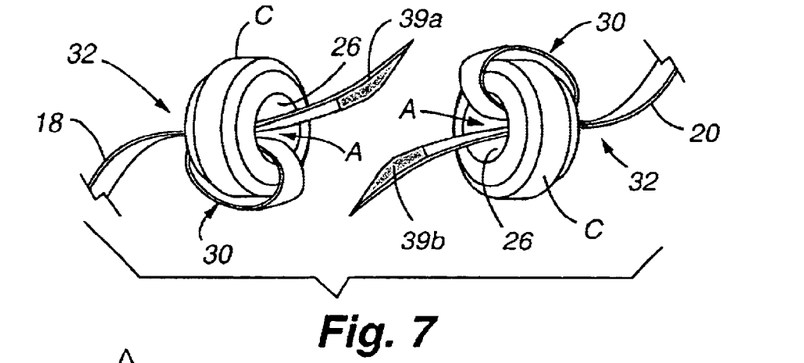
FIG. 7 is a perspective view showing two end portions that can be attached.
Figure 8:
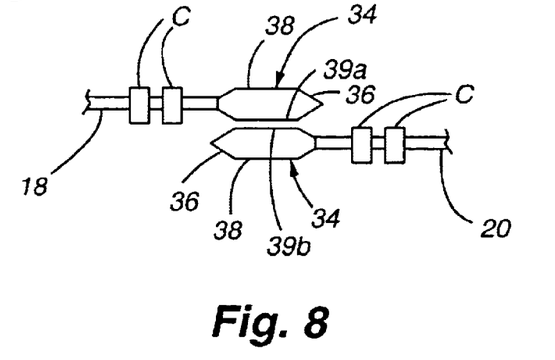
FIG. 8 is a side elevation view of two retention fittings that can be attached.

Referring now to FIGS. 7 and 8, in a separate aspect of the invention, the end portion 32 on a first strap may be coupled to the end portion 32 of a second adjacent strap. For example, a means for detachably attaching the end portion 32 of strap 18 may be provided for interconnecting it with the end portion 32 of strap 20. Such means may include a fastening mechanism such as a clasp, or S-shaped fastener known to those skilled in the art. Referring still to FIG. 7, a first side 39a of a hook and loop connector is interconnectable with a second side 39b of the hook and loop connector to interconnect two end portions 32 of two straps, such as straps 18 and 20, or straps 22 and 24. Referring to FIG. 8, if retention fittings 34 are used, the means for interconnecting two retention fittings may include a fastenable band placed around the fittings 34, an elastic band, male and female detachable interlocking portions, a clasp, a friction or interference fitting similar to the end of a writing pen or marker, and/or a hook and loop connector operatively associated with the retention fittings, as well as a pin, key ring, quick release buckle, carabineer, buckle, button, snap, chain, etc. Referring still to FIG. 8, a first side 39a of a hook and loop connector is interconnectable with a second side 39b of the hook and loop connector to interconnect two end portions 32 of two straps using retention fittings 34, where the retention fittings 34 are interconnected to straps, such as straps 18 and 20, or straps 22 and 24.

Figure 9:
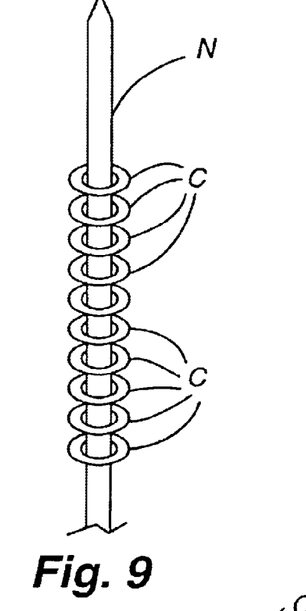
FIG. 9 is an elevation view of a separate aspect of the invention that may be used for placing items such as candy along a strap.

Referring now to FIG. 9, in a separate aspect of the invention, a method is provided of placing an edible item or candy on a strap of an article. The method includes providing an article that includes at least one strap with an end portion capable of receiving edible items or candies having an aperture. For garment 10 illustrated in FIG. 1, straps 18, 20, 22, and 24 are preferably made of silk, satin, and/or velvet material. The person placing the edible item or candy onto a strap preferably uses a plastic needle N shown in FIG. 9, and typically places 5 to 10 edible items or candies C on the needle N by threading or sliding the needle N through the aperture A of the edible items or candies C. Next, the person then tips the needle N to the strap 18, 20, 22, or 24 and transfers the edible items or candies onto the strap, if necessary, pushing the edible items or candies C onto the strap 18, 20, 22, or 24 as may be required, depending upon the width W of the strap and the size of the aperture A of the edible item or candy C. The needle N and/or extra edible items or candies may be provide as a resupply kit to allow the consumer of the garment 10, or other articles embodying the invention, to add edible items or candies to their article as they wish. In addition, the needle N can also be used to facilitate placing other non-edible items onto the strap or straps, such as charms, keys, jewels, trinkets, etc.

Figure 10:
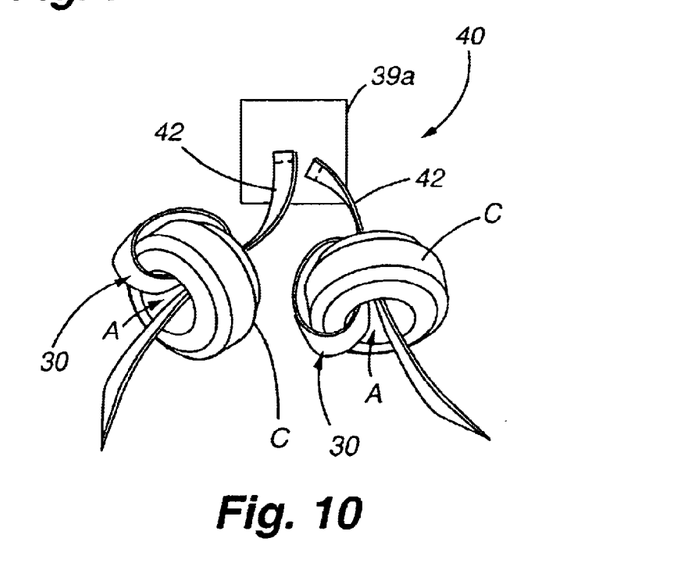
FIG. 10 is a perspective view of an alternate embodiment of a fob with straps containing candy thereon.

Referring now to FIG. 10, in yet a separate aspect of the invention, an attachable device, otherwise referred to herein as a fob 40 is provided for interconnecting an edible item or candy C to an article, such as a garment, toy, backpack, or hat. In one embodiment shown in FIGS. 1 and 5, one or more fobs 40 are interconnected to a garment 10 along the front panel 12; however, the fob 40 may also be interconnected to another portion of the garment 10, such as the rear panel 14. Preferably, the fob 40 includes one or more fob straps 42 that are adapted for receiving an edible item or candy C similar to the manner discussed above. More particularly, the edible item or candy C is placed on the fob straps 42 by sliding the fob strap 42 through the aperture A of the edible item or candy C. The edible item or candy C is secured to the fob strap 42 either by friction, and/or by a loop 30, and/or a retention fitting 34, and/or some other means for retaining the edible item or candy C on the fob strap 42. The fob strap 42 is either permanently or detachably interconnected to the article by a means for attaching, such as a connector that may include, but is not limited to, a clasp, pin, key ring, quick release buckle, carabineer, buckle, button, snap, chain, adhesive, stitching, or hoop and loop (Velcro®) device, etc. For FIG. 10, a first side 39a of a hook and loop connector on the fob 40 is interconnectable with a second side 39b of the hook and loop connector attached to an article or garment, such as garment 10 shown in FIGS. 1 and 5.

Figures 11, 12, 13, 14:
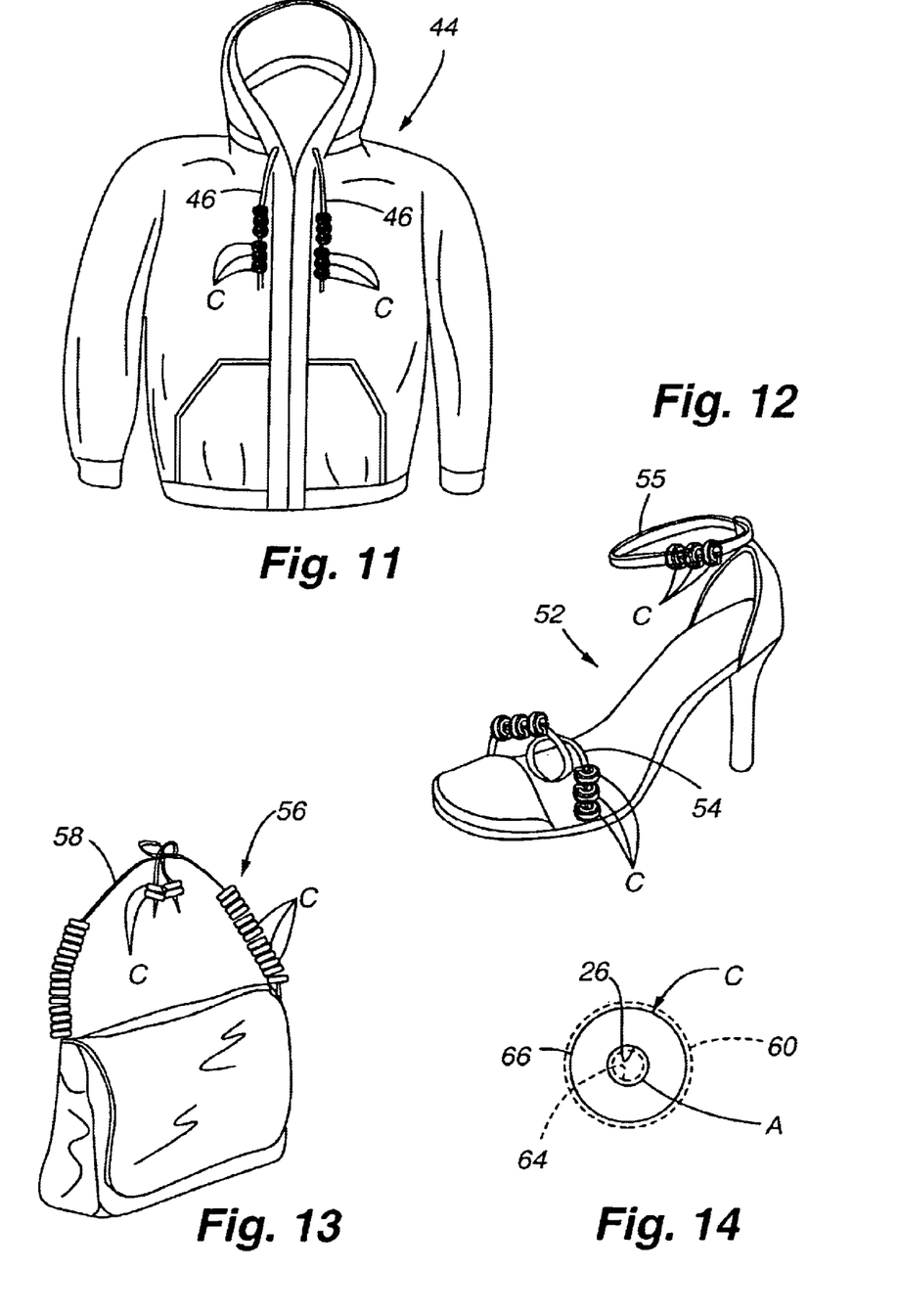
FIG. 11 is a perspective view showing edible items or candies threaded onto the cords or tie strings of a hood garment, such as a hooded sweatshirt or jacket.
FIG. 12 is a perspective view showing edible items or candies threaded onto the straps of a shoe.
FIG. 13 is a perspective view showing edible items or candies threaded onto a strap of a purse.
FIG. 14 is an elevation view showing an edible item or candy with a wrapper.
Figure 41:
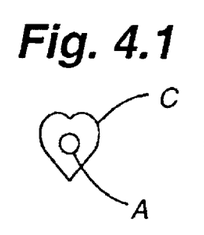
Figure 42:
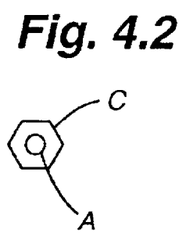
Figure 43:
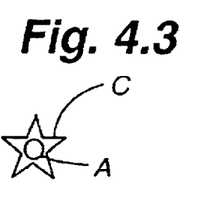
Figure 44:
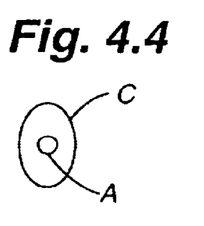
Figure 45:
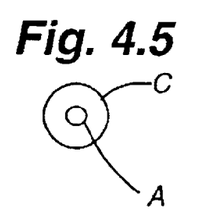
Figure 46:
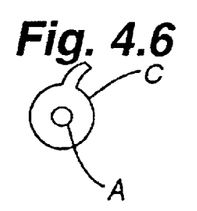
Figure 47:
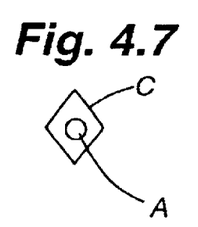
Figure 48:
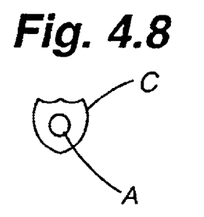

Referring now to FIGS. 1, 5 and 11–13, a series of articles are shown wherein they illustrate use of the present of invention. More particularly, FIG. 11 illustrates a hooded garment 44, such as a hooded sweatshirt or jacket or the like, wherein the tie strings 46 are adapted for holding an edible item or candy C. FIGS. 1 and 5 illustrate a breast support garment 48, such as a bikini top of bra, wherein the straps 50 include one or more edible items or candies C. FIG. 12 illustrates a shoe 52 that includes a toe strap 54 and or an ankle strap 55 that hold one or more edible items or candies C. In addition, FIG. 13 illustrates a purse 56 with a strap 58 that holds one or more edible items or candies C. Thus, the versatility of the present invention is demonstrated in these few examples. Straps that typically do not have an end portion, such as the strap along the toe of a shoe or between the breast cups of bikini, may be adapted for receiving an edible item or candy by providing a clasp that interconnects to a loop in the end of the strap. Obviously, other articles may be adapted for accommodating one or more edible items or candies along a strap that is an integral part of the article, or that is otherwise attached to the article, such as by a fob discussed above.

Referring now to FIG. 14, in yet a separate aspect of the invention, an edible item or candy C is provided for use in the above-described embodiments, wherein the edible item or candy C includes a wrapper 60 fully enclosing the surfaces of the edible item or candy C, but also providing an aperture through both the wrapper 60 and the edible item or candy C. More particularly, an edible item or candy C having an aperture A is provided with a wrapper 60, such as shrink wrap, that wraps the exterior surface 62 of the edible item or candy C and also includes a wrapper aperture 64 that is axially aligned with the aperture A of the edible item or candy C and wraps the interior surface 26 of the aperture A, thus providing a layer of protection to the edible item or candy C. Therefore, a strap may be inserted through the aperture A of the edible item or candy C and be prevented from contacting the inside surface 26 of the aperture A of the edible item or candy C because of the presents of the wrapper 60 lining the inside surface 26 of the edible item or candy C. Additionally, the wrapper 60 also serves to isolate the exterior surface 66 of the edible item or candy C and thereby substantially isolate the exterior surface 66 of the edible item or candy C from contacting other objects, surfaces, or substances, including the surface of the person's skin wearing a garment, such as garment 10, that incorporates a wrapped edible item or candy C. Thus, not only is the edible item or candy protected from the person's skin, but sweat, tanning lotion, perfume, dirt, etc. are also prevented from contacting the edible item or candy. It is again noted that the term "edible item" as defined herein includes any edible material or substance, including oral medications that may be ingested. Thus, a wrapping may protect an edible item, candy, or pill of medication from dissolving because of contact with a person's skin, or otherwise reacting with a person's skin or another object, substance, or contaminant. In addition, the wrapper 60 may also prevent the dye of a edible item or candy C from contacting and/or staining an another article of clothing worn by the person who is wearing a garment of the present invention.

To assist in the understanding of the present invention the following list of components and associated numbering found in the drawings is provided herein:

| Number | Component |
|---|---|
| 10 | garment |
| 12 | front panel |
| 14 | rear panel |
| 16 | crotch portion |
| 18 | right front strap |
| 20 | right rear strap |
| 22 | left front strap |
| 24 | left rear strap |
| 26 | inside surface (of edible item or candy aperture) |
| 28 | outside surface (of a strap) |
| 30 | loop |
| 32 | end portion (of strap) |
| 34 | retention fitting |
| 36 | tip (of end portion) |
| 38 | flared portion |
| 39a | first side of hook and loop connector |
| 39b | second side of hook and loop connector |
| 40 | fob |
| 42 | fob strap |
| 44 | hooded garment |
| 46 | tie strings |
| 48 | breast support garment |
| 50 | strap |
| 52 | shoe |
| 54 | toe strap |
| 55 | ankle strap |
| 56 | purse |
| 58 | strap |
| 60 | wrapper |
| 62 | exterior surface (of edible item or candy) |
| 64 | wrapper aperture |
| 66 | exterior surface (of edible item or candy) |
| A | aperture (of edible item or candy) |
| C | edible item or candy |
| D | diameter (of aperture) |
| N | needle |
| P | person |
| W | width |

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably. In addition, the term "strap" herein is interchangeable with the term "string" as is commonly used in describing the string components of a string bikini, g-string, tie strings, etc.

While various embodiments of the present invention have been described in detail, it will be apparent that further modifications and adaptations of the invention will occur to those skilled in the art. It is to be expressly understood that such modifications and adaptations are within the spirit and scope of the present invention.

What is claimed is:

1. A garment for a person comprising:
   at least one non-edible strap:
   at least one edible item interconnected to said strap;
   wherein said edible item comprises a candy having at least one aperture and wherein said strap passes through said aperture, said candy including a wrapper and having a wrapper aperture that is axially aligned with the at least one aperture in said candy; and
   wherein said garment can be worn by the person.

2. A garment for covering a portion of a person's body, the garment comprising:
   a front panel;
   a rear panel interconnected to said front panel by a crotch portion;
   at least one strap interconnectable to said front and and said rear panel, said strap adapted for passing through an aperture of a candy, said strap consisting essentially of a material having a length greater than or equal to a width of the candy, said material having a width that is greater than or equal to a diameter of said aperture of said candy, said material having an outside surface that contacts an inside surface of said aperture, said outside surface of said material developing a frictional force with said inside surface of said candy that is equal to or greater than a weight of said candy, said strap having a loop at an end portion, said loop wrapping around at least a portion of said candy;
   and wherein upon removing said candy from said strap, said front panel, said rear panel, said crotch portion, and said strap are non-edible and washable.

3. A garment for covering a portion of a person's body, the garment comprising:
   a front panel including a right front strap and a left front strap;
   a rear panel interconnected to said front panel by a crotch portion, said rear panel including a right rear strap interconnectable to said right front strap, and left rear strap interconnectable to said left front strap;
   and at least one edible item having an aperture sized to slidably receive one of said right front strap, said left front strap, said right rear strap and said left rears strap, and wherein said at least one edible item is located on one of said right front strap, said left front strap, said right rear strap and said left rear strap.

4. The garment as claimed in claim 3, wherein an end portion of at least one of said right front strap, said left front strap, and right rear strap and said left rear strap includes a first retention fitting.

5. The garment as claimed in claim 4, wherein said first retention fitting comprises a substantially conical tip portion and a flared portion made of a resilient material, and wherein said flared portion has an underformed width that is greater than a diameter of said aperture, wherein the flared portion is deformable to receive the edible item when the edible item is pushed over the flared portion of the retention fitting.

6. The garment as claimed in claim 5, wherein an end portion of another of said right front strap, said left front strap, said right rear strap and said left rear strap includes a second retention fitting, said second retention fitting including means for detachably attaching to said first retention fitting.

7. The garment as claimed in claim 6, wherein said means for detachably attaching includes a connector.

* * * * *